US011436653B1

(12) United States Patent
Burkett et al.

(10) Patent No.: US 11,436,653 B1
(45) Date of Patent: Sep. 6, 2022

(54) HYBRID SYSTEM EVENT PROCESSING

(71) Applicant: Amazon Technologies, Inc., Seattle, WA (US)

(72) Inventors: Bradley Nathaniel Burkett, Seattle, WA (US); Kaili Xu, Mercer Island, WA (US); Alireza Sahraei, Seattle, WA (US); Mustafa Ugur Torun, Seattle, WA (US); Surya Prakash Dhoolam, Mill Creek, WA (US); Hans-Philipp Anton Hussels, North Bend, WA (US); James Paul Kardos, Sammamish, WA (US); Jonathan Lim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 16/584,361

(22) Filed: Sep. 26, 2019

(51) Int. Cl.
*G06Q 30/06* (2012.01)
*G06F 13/36* (2006.01)
*G06F 16/23* (2019.01)
*G06F 9/54* (2006.01)

(52) U.S. Cl.
CPC ......... *G06Q 30/0613* (2013.01); *G06F 9/542* (2013.01); *G06F 13/36* (2013.01); *G06F 16/2379* (2019.01)

(58) Field of Classification Search
CPC ......... G06Q 30/13; G06F 13/36; G06F 9/542; G06F 16/2379
USPC ...................................................... 705/26.41
See application file for complete search history.

(56) References Cited

U.S. PATENT DOCUMENTS

| 10,673,694 | B2 * | 6/2020 | Featonby | H04L 41/12 |
| 10,997,000 | B1 * | 5/2021 | Meyers | G06F 9/542 |
| 2004/0028069 | A1 * | 2/2004 | Tindal | H04L 45/56 |
| | | | | 370/429 |
| 2016/0154692 | A1 * | 6/2016 | Heinz | G06F 11/0793 |
| | | | | 714/2 |

FOREIGN PATENT DOCUMENTS

| CN | 109101340 A | * 12/2018 | ............. G06F 9/505 |
| GB | 2528589 A | * 1/2016 | .......... H04M 3/4217 |

OTHER PUBLICATIONS

Hofstatter, M., Belbachir, A. N., Bodenstorfer, E., & Schon, "Multiple input digital arbiter with timestamp assignment for asynchronous sensor arrays" Published 2007, as 13 IEEE International Conference on Electronics, Circuits and Systems, retrieved from Dialog database on Dec. 31, 2021.*

* cited by examiner

*Primary Examiner* — Yogesh C Garg
(74) *Attorney, Agent, or Firm* — Davis Wright Tremaine LLP

(57) ABSTRACT

A computing resource monitoring service obtains a request from a third-party partner system to generate a first bus. In response to the request, the computing resource monitoring service updates an account associated with a customer of a remote service to indicate presence of the first bus. The computing resource monitoring service activates the first bus to establish an association with a second bus, obtain a set of events generated by a resource of the third-party partner system, and provides the set of events to the first bus. The computing resource monitoring service publishes the set of events to cause the second bus to distribute the set of events to another remote service.

20 Claims, 9 Drawing Sheets

HYBRID SYSTEM EVENT PROCESSING

BACKGROUND

Computing resource service provider and other service providers often provide customers with mechanisms for monitoring compute events resulting from execution or use of resources maintained by the computing resource service provider on behalf of these customers. However, customers may use these resources in conjunction with other resources provided by third-party partner and on-premise systems. Being able to monitor compute events associated with resources maintained by the computing resource service provider and by these third-party partner systems is difficult. Further, consolidating events from these sources can be labor intensive for these customers.

BRIEF DESCRIPTION OF THE DRAWINGS

Various techniques will be described with reference to the drawings, in which.

DETAILED DESCRIPTION

Figure 1:
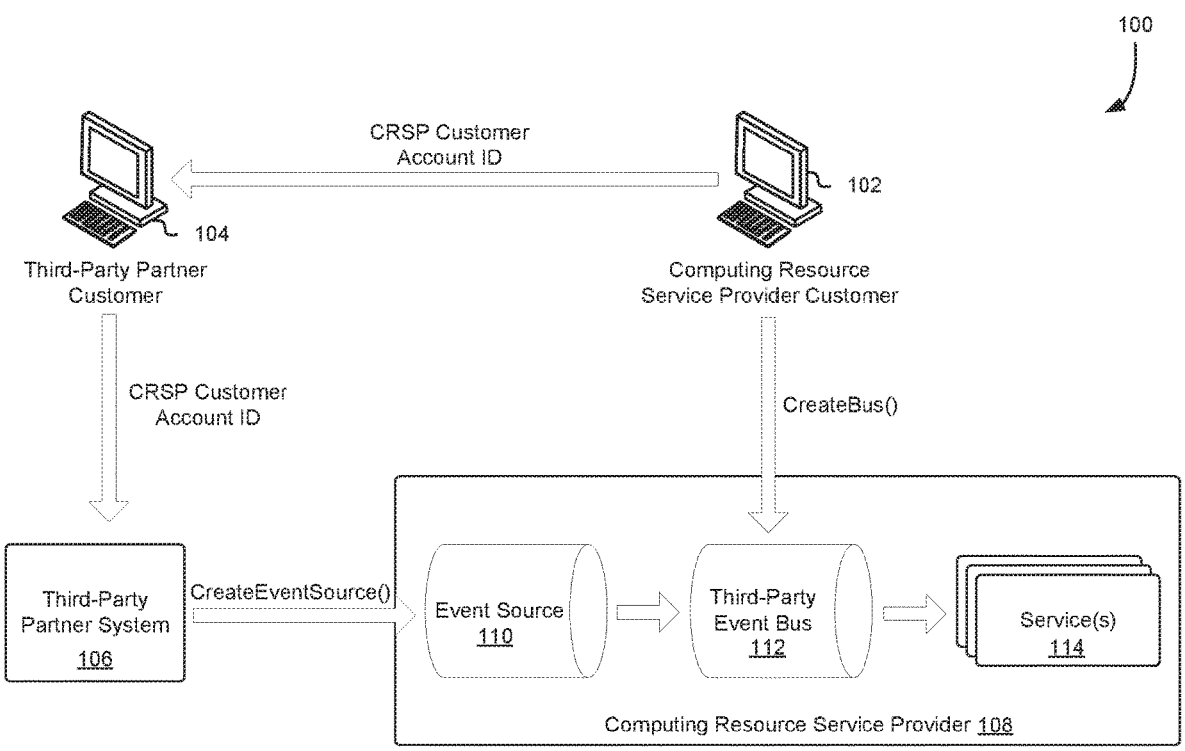
FIG. 1 shows an illustrative example of a system in which various embodiments can be implemented.

Techniques described and suggested herein relate to the publishing and consuming of compute events associated with a set of resources maintained by a third-party partner system. In an example, a third-party partner system obtains a request from a customer of the third-party partner system to create an event source bus within a computing resource monitoring service of a computing resource service provider to make events generated by an event generator of the third-party partner system available to a customer of the computing resource service provider. The request from the customer of the third-party partner system may specify an identifier corresponding to an account of the customer of the computing resource service provider. Additionally, this request may include an identifier corresponding to the event generator from which the third-party event system is to obtain events for delivery to the computing resource service provider. The customer of the third-party partner system and the customer of the computing resource service provider may be the same entity.

In an example, the third-party partner system submits a request to the computing resource monitoring service to create the event source bus. This request may be submitted as an application programming interface (API) call to the computing resource monitoring service, through which the third-party partner system may specify the identifier corresponding to the account of the customer of the computing resource service provider, as well as a desired identifier for the event source bus to be created by the computing resource monitoring service. In response to this request, the computing resource monitoring service may create the event generator bus and assign the desired identifier to the event source bus. Additionally, the computing resource monitoring service may associate this event source bus with the customer account corresponding to the account identifier provided by the third-party partner system. The computing resource monitoring service may provide, to the third-party partner system, a resource name corresponding to the event source bus. This may cause the third-party partner system to associate the event generator from which events are to be used to populate the event source bus with the resource name of the event source bus. Thus, as events are generated by the event generator, the third-party partner system may identify the corresponding event source bus to which the events are to be published and transmit these events to the corresponding event source bus.

In an example, the computing resource monitoring service obtains a request from the customer of the computing resource service provider to create a third-party event bus that may be used to ingest events from the event source bus. The request may specify an identifier corresponding to the event source bus, as well as a set of rules for processing the events from the event source bus. For instance, the rules may specify one or more services that are to obtain the events from the third-party event bus for processing of these events. In response to the request from the customer, the computing resource monitoring service may determine whether the identified event source bus has been activated for use. For instance, if an event source bus is created but is not associated with a third-party event bus, the event source bus may be maintained in a "pending" state. In response to the request, the computing resource monitoring service may activate the event source bus to place the event source bus in an "active" state. This may cause the computing resource monitoring service to initiate transmission of events from the event source bus to the third-party event bus and to any other computing resource services in accordance with the rules specified by the customer.

In an example, the computing resource monitoring service can obtain a request from the customer of the computing resource service provider to delete the third-party event bus. In response to the request, the computing resource monitoring service may delete the third-party event bus and determine whether there were any event source buses associated with this third-party event bus. If the computing resource monitoring service determines that no event source buses were associated with the deleted third-party event bus, the computing resource monitoring service may indicate that the request has been fulfilled. Alternatively, if the computing resource monitoring service determines that the deleted third-party event bus was associated with one or more event source buses, the computing resource monitoring service may monitor these one or more event source buses to determine whether these event source buses are associated with other active third-party event source buses or are otherwise receiving events from the third-party partner system. These event source buses may be subject to an expiration such that, if an event source bus is no longer associated with a third-party event bus and/or has not received an event from the third-party partner system over a pre-determined period of time, the event source bus may be deemed expired. If an event source bus is expired, the computing resource monitoring service may remove this event source bus.

In an example, the computing resource monitoring service can obtain a request from the third-party partner system to remove an event source bus. In response to the request, the computing resource monitoring service may remove the event source bus and determine whether the event source was associated with any third-party event buses. If the computing resource monitoring service determines that the event source bus is not associated with any third-party event buses, the computing resource monitoring service may indicate that the request was fulfilled and terminate the process. However, if the event source bus was associated with one or more third-party event buses, the computing resource monitoring service may identify the customers that are associated with these computing resource monitoring services and transmit a notification to these customers to indicate that the event source bus has been removed. These customers may access the third-party partner system to create new event source buses to be associated with these third-party event buses or to submit a request to the computing resource monitoring service to delete the third-party event bus.

As one skilled in the art will appreciate in light of this disclosure, certain embodiments may be capable of achieving certain advantages. For instance, because the third-party event bus is generated independently of the event source bus, the removal of the event source bus may have minimal impact on the processing of any pending events maintained within the third-party event bus, which may be transmitted to other services of the computing resource service provider in accordance with the rules provided by the customer of the computing resource service provider. Further, because the creation of an event source bus requires an identifier corresponding to an account maintained by the computing resource service provider, the computing resource monitoring service may present, to the customer and via an interface, the various event source buses that may be available to the customer for association with a third-party event bus. Thus, the customer, through this interface, may select the event sources for the third-party event bus and tailor rules specific to these particular types of events. This may also allow for the customer to define any number of third-party event buses and define specific rules corresponding to events from different event source buses as needed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a third-party partner customer 104 transmits a request to a third-party partner system 106 to create an event source bus 110 in order to make events generated by an event generator of the third-party partner system 106 available to one or more services 114 provided by a computing resource service provider 108. In an embodiment, the request from the third-party partner customer 104 specifies an identifier corresponding to an account of a computing resource service provider customer 102 maintained by the computing resource service provider 108. For instance, the third-party partner customer 104 may transmit a request to the computing resource service provider customer 102 to obtain this identifier in order to make available, to the computing resource service provider customer 102, events generated by an event generator of the third-party partner system 106. Alternatively, the computing resource service provider customer 102 may provide the identifier of this account along with a request to the third-party partner customer 104 to publish events from an event generator of the third-party partner system 106 to the computing resource service provider 108. The events may include actions partaken by the event generator in response to some programmatic stimuli, such as an occurrence of an error or other trigger. In some instances, events may include messages generated by the event generator or otherwise processed by the event generator that may be of interest to other entities, information indicating a state change of the event generator or other resource associated with the event generator, and the like.

The third-party partner system 106, in some embodiments, is a Software as a Service (SaaS) vendor that may provide network hosting services for the development of software and for version control of the software generated through these services. The third-party partner system 106 may, alternatively, provide resources to customers, such as network storage services, virtual computing services, mass mailing services, and the like. In an embodiment, the third-party partner customer 104 and the computing resource service provider customer 102 are the same entity. The mutual customer (e.g., third-party partner customer 104 and computing resource service provider customer 102) may be an organization comprising a user that manages an account with the third-party partner system 106 (e.g., the third-party partner customer 104) and a different user that manages an account with the computing resource service provider (e.g., the computing resource service provider customer 102).

In an embodiment, the third-party partner system 106 transmits an API call (e.g., "CreateEventSource( )" as illustrated in FIG. 1) to the computing resource service provider 108 to request creation of an event source bus 110 that may be used to publish events from a particular event generator identified in the request from the third-party partner customer 104. The event source bus 110 may comprise a communication system within the computing resource service provider 108 that may transmit data to other computer systems and buses maintained by the computing resource service provider 108. In some instances, the event source bus 110 may comprise a set of entries in a database maintained by a computing resource monitoring service of the computing resource service provider 108. The database may implement a publish/subscribe model whereby subscribers may subscribe to particular topics whereby updates to the entries in the database are categorized into classes. Subscribers may subscribe to topics associated with these classes to obtain updates published to these topics and categorized into the corresponding classes. The API call to the computing resource service provider 108 may specify, as a parameter, the identifier corresponding to the account of a computing resource service provider customer 102 maintained by the computing resource service provider 108. Additionally, the API call may specify a unique name that is to be assigned to the event source bus 110. In an embodiment, the third-party partner system 106 associates this unique name for the event source bus 110 with the event generator that is to generate events that are to be published to the event source bus 110.

In response to the API call from the third-party partner system 106, the computing resource service provider 108 may generate the event source bus 110 and identify, based on the identifier corresponding to the account of the computing resource service provider customer 102, the account. The computing resource service provider 108 may associate the event source bus 110 with the account of the computing resource service provider customer 102 to allow this customer 102 to determine that the event source bus 110 is available for use, as described in greater detail below. Additionally, the computing resource service provider 108 may assign, to the event source bus 110, a unique resource name that may be used by the computing resource service provider 108 to manage the state of the event source bus 110. For instance, in response to creating the event source bus 110 in response to the API call from the third-party partner system 106, the computing resource service provider 108 may set the state of the event source bus 110 to "pending," as the event source bus 110 has not yet been assigned to any resources associated with the account of the computing resource service provider customer 102. The computing resource service provider 108 may provide the resource name assigned to the event source bus 110 to the third-party partner system 106 to allow the third-party partner system 106 to access the event source bus 110 and publish events to the event source bus 110.

In an embodiment, the computing resource service provider 108 obtains a request from the computing resource service provider customer 102 to generate a third-party event bus 112 that may be used to publish events to one or more services 114 provided by the computing resource service provider 108. The request from the computing resource service provider customer 102 may be provided in the form of an API call (e.g., "CreateBus( )" as illustrated in FIG. 1) that specifies an identifier of an event source bus 110 that is to be associated with the third-party event bus 112 to cause the event source bus 110 to publish events to the third-party event bus 112. For instance, in an embodiment, the computing resource service provider 108 provides, to the computing resource service provider customer 102, an interface (e.g., a graphical user interface (GUI), etc.) through which the computing resource service provider customer 102 can define the characteristics of the third-party event bus 112. For instance, the computing resource service provider customer 102, through the interface, may select which event source bus 110 is to be associated with the third-party event bus 112. The computing resource service provider 108 may populate the interface with identifiers corresponding to the various event source buses 110 that are associated with the account of the computing resource service provider customer 102. In an embodiment, direct access to the event source buses 110 by the computing resource service provider customer 102 is restricted by the computing resource service provider 108 such that the computing resource service provider customer 102 may only see the resource names or identifiers of the event source buses 110 through the interface. In an alternative embodiment, the computing resource service provider 108 exposes an API to the computing resource service provider customer 102 that the customer 102 may use to obtain a listing of the available event source buses 110.

In response to this API call from the computing resource service provider customer 102, the computing resource service provider 108 may generate the third-party event bus 112 and assign a resource name to the third-party event bus 112. Further, the computing resource service provider 108 may set the state of the third-party event bus 112 to "bus exists" to indicate that the third-party event bus 112 has been created. The computing resource service provider 108 may associate the newly created third-party event bus 112 with any event source buses 110 indicated by the customer 102 in its request to the computing resource service provider 108. In an embodiment, if the state of the event source bus 110 is set to "pending" and the state of the third-party event bus 112 is set to "bus exists," the computing resource service provider 108 activates the event source bus 110 by setting the state of the event source bus 110 to "active." This may cause the event source bus 110 to start publishing events to the third-party event bus 112 as events are provided to the event source bus 110 by the third-party partner system 106. Similar to the event source bus 110, the third-party event bus 112 may comprise a communication system within the computing resource service provider 108 that may transmit data to other computer systems, such as the computer systems and resources of the one or more services 114 provided by the computing resource service provider 108.

In an embodiment, the computing resource service provider 108 obtains, from the computing resource service provider customer 102, a request to implement one or more rules for publishing events from the third-party event bus 112 to other entities. The one or more rules may specify where the events of the third-party event bus 112 are to be transmitted. For instance, the one or more rules may indicate that events obtained from a particular event source bus 110 are to be published to a particular service 114 provided by the computing resource service provider 108 or to other accounts maintained by the computing resource service provider 108. The computing resource service provider customer 102 may not be required to provide the one or more rules to the computing resource service provider 108, in which case the computing resource service provider 108 may implement one or more default rules for placement of events from the third-party event bus 112. For instance, a default rule may cause the computing resource service provider 108 to publish events from the third-party event bus 112 to a repository of the computing resource service provider customer 102.

At any time, the computing resource service provider 108 may obtain a request from the computing resource service provider customer 102 to delete a third-party event bus 112 from its account. In response to the request, the computing resource service provider 108 may delete the third-party event bus 112 from the account of the customer 102 and determine whether the third-party event bus 112 was associated with any event source buses 110 maintained by the computing resource service provider 108. If the computing resource service provider 108 determines that the third-party event bus 112 was not associated with any event source buses 110, the computing resource service provider 108 may transmit a notification to the customer 102 to indicate that the third-party event bus 112 has been deleted. In an embodiment, if the third-party event bus 112 is associated with one or more event source buses 110, the computing resource service provider 108 sets the state of the third-party event bus 112 to "no bus" within the state machine corresponding to each pairing of the third-party event bus 112 to the associated event source buses 110. As a result, the state machine may cause the state of the associated event source buses 110 to change from "active" to "pending." This may trigger the state machine to monitor usage of the associated event source buses 110 to determine whether the event source buses 110 have expired. For instance, the state machine may monitor an event source bus 110 for a pre-determined period of time corresponding to an expiration to determine whether the period of inactivity for the event source bus 110 reaches this pre-determined period of time. If so, the state machine may determine that the event source bus 110 has expired and cause the computing resource service provider 108 to delete the event source bus 110. However, if the state machine detects that the event source bus 110 is active (e.g., publishing events to other third-party event buses, etc.), the state machine may reset the expiration timer for the event source bus 110. Deletion of an event source bus 110 may cause the state machine to set the state for the pairing to "no event source, no bus."

In an embodiment, the computing resource service provider 108 obtains, from the third-party partner system 106, a request to delete an event source bus 110. In response to the request, the computing resource service provider may determine whether the event source bus 110 is still publishing events to a third-party event bus 112 and, if so, whether such publishing should be terminated. This determination may be based on the parameters of the request. For instance, the third-party partner system 106 may specify, in the request, that the event source bus 110 is to terminate any further publishing of events to the third-party event bus 112. Alternatively, the third-party partner system 106 may specify that the event source bus 110 is to be deleted only after it has completed publishing any pending events to the third-party event bus 112.

If the event source bus 110 is to be deleted immediately and/or or the event source bus 110 has completed publishing any pending events to the third-party event bus 112, the computing resource service provider may delete the event source bus 110 and set the state for the pairing of the event source bus 110 to each third-party event bus 112 associated with the event source bus 110 to "deleted, bus exists." Alternatively, if there are no third-party event buses associated with the event source bus 110, the computing resource service provider 108 may set the set for the pairing of the event source bus 110 to each third-party event bus 112 to "no event source, no bus."

In an embodiment, if the deleted event source bus was associated with an active third-party event bus 112, the computing resource service provider 108 identifies the computing resource service provider customer 102 associated with this third-party event bus 112. For instance, the computing resource service provider 108 may use the resource name of the affected third-party event bus 112 as input to a query of accounts maintained by the computing resource service provider 108 to identify any accounts associated with the third-party event bus 112. From these accounts, the computing resource service provider 108 may identify the impacted customers. The computing resource service provider 108 may transmit a notification to each impacted customer 102 to indicate that the event source bus 110 has been deleted. This may cause the customer 102 to evaluate the third-party event bus 112 to determine whether the third-party event bus 112 is to be deleted or to be associated with other available event source buses 110 that may be available to the customer 102.

Figure 2:
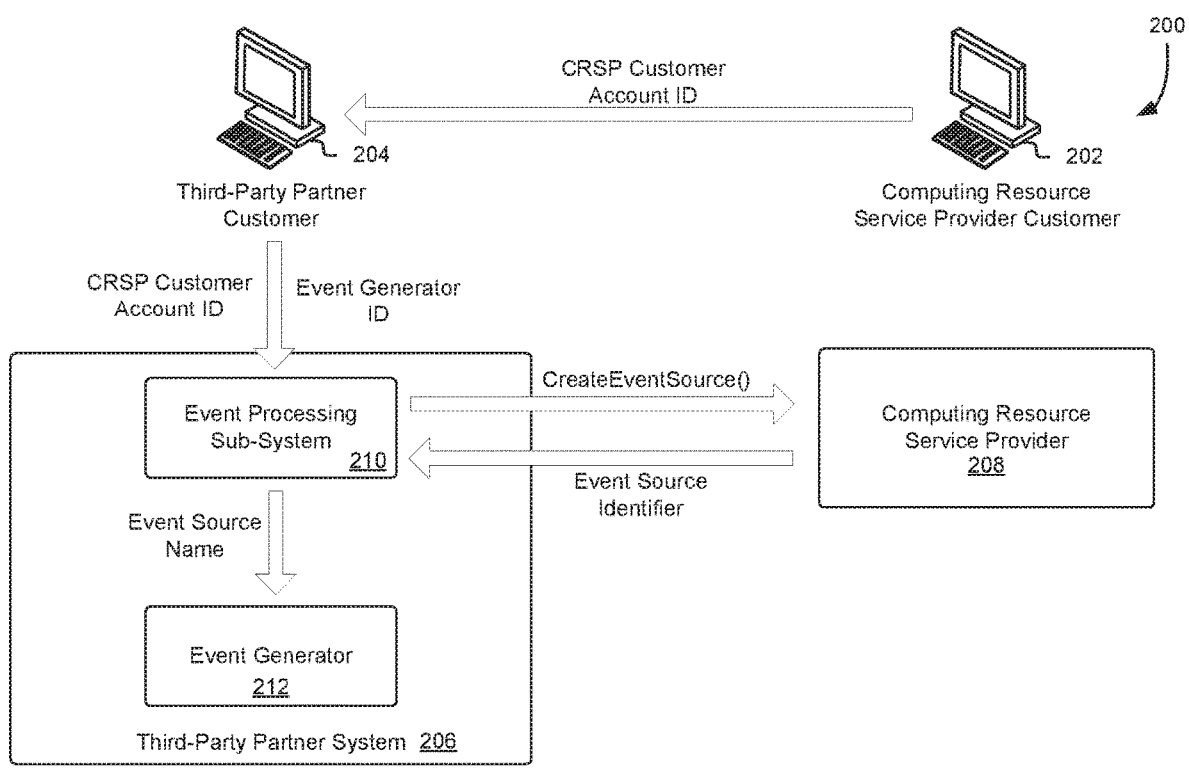
FIG. 2 shows an illustrative example of a system in which a third-party partner system generates an event source bus to be used for providing events from an event generator to a computing resource service provider in accordance with at least one embodiment.

FIG. 2 shows an illustrative example of a system 200 in which a third-party partner system 206 generates an event source bus to be used for providing events from an event generator 212 to a computing resource service provider 208 in accordance with at least one embodiment. In the system 200, a third-party partner customer 204 submits a request to an event processing sub-system 210 of a third-party partner system 206 to create an event source bus within a computing resource service provider 208 to make events generated by an event generator 212 available to a computing resource service provider customer 202. The request from the third-party partner customer 204 may specify an account identifier corresponding to an account of the computing resource service provider customer 202. For instance, the computing resource service provider customer 202 may transmit a notification to the third-party partner customer 204 to indicate that the computing resource service provider customer 202 wants to obtain events generated by an event generator 212 in order to make these events available to one or more other services provided by the computing resource service provider 208, to other services associated with a different computing resource service provider, to the third-party partner system 206, or any other entity as designated by the computing resource service provider customer 202. In this notification, the computing resource service provider customer 202 may provide an identifier corresponding to an account of the computing resource service provider customer 202 maintained by the computing resource service provider 208. As noted above, the third-party partner customer 204 and the computing resource service provider 202 may be the same entity. For instance, the mutual customer (e.g., third-party partner customer 204 and computing resource service provider customer 202) may be an organization comprising a user that manages an account with the third-party partner system 206 (e.g., the third-party partner customer 204) and a different user that manages an account with the computing resource service provider 208 (e.g., the computing resource service provider customer 202).

The request from the third-party partner customer 204 may also specify an identifier corresponding to an event generator 212 from which events are to be obtained and published to the event source bus generated in response to the request. The event generator 212 may be a resource or set of resources maintained by the third-party partner system 206 that generates events. For instance, the event generator 212 may include an account, a network channel, a data repository, and the like. Each event generator 212 maintained by the third-party partner system 206 may have a unique name within the namespace of the third-party partner system 206. In an embodiment, the third-party partner system 206 provides, to the third-party partner customer 204, a listing of event generators accessible by the third-party partner customer 204 from which events may be obtained. This listing may be provided via an interface, such as a GUI, or in response to an API call from the third-party partner customer 204 to identify the event generators that may be available to the third-party partner customer 204. As noted above, the request from the third-party partner customer 204 may be obtained by the event processing sub-system 210 of the third-party partner system 206. The event processing sub-system 210 is implemented using hardware and software of the third-party partner system 206 or abstraction thereof (such as one or more virtual machines operating via a hypervisor) and can comprise one or more processors and memory that stores executable instructions whose execution by the one or more processors causes the computer system to perform operations described herein.

In response to the request from the third-party partner customer 204, the event processing sub-system 210 may identify the event generator 212 from which events are to be obtained for publishing to the requested event source bus. Additionally, the event processing sub-system 210 may assign an event source name that is to be associated with the requested event source bus. The event processing sub-system 210 may associate this event source name with the event generator 212 such that any events generated by the event generator 212 may be published to the requested event source by the event processing sub-system 210. The event source name assigned by the event processing sub-system 210 may be unique in order to ensure that events generated by the event generator 212 are published to the correct event source bus within the computing resource service provider 208 environment.

In an embodiment, the event processing sub-system 210 transmit a request, such as an API call (e.g., "CreateEventSource( )" as illustrated in FIG. 2) to the computing resource service provider 208 to generate a new event source bus for the third-party partner customer 204. The request to the computing resource service provider 208 may specify the identifier of the account of the computing resource service provider 202, as well as the unique event source name created by the event processing sub-system 210 that is to be assigned to the event source bus. In response to the request from the event processing sub-system 210, the computing resource service provider 208 may generate the event source bus and assign, to the event source bus, a unique event source identifier (e.g., resource name). This unique event source identifier may be used by the computing resource service provider 208 to utilize the event source bus for maintaining the state of any pairing between the event source bus and a corresponding third-party event bus created by the computing resource service provider 208 on behalf of the computing resource service provider customer 202.

In an embodiment, the computing resource service provider 208 determines whether the event source name provided by the event processing sub-system 210 conforms to a set of requirements imposed by the computing resource service provider 208. For instance, the computing resource service provider 208 may indicate that the event source name is to comprise the name of the third-party partner system 206 as well as the name of the event generator 212. Further, in some instances, the computing resource service provider 208 may impose a rule whereby the event generator name is to comprise solely American Standard Code for Information Interchange (ASCII) characters in order for the computing resource service provider 208 to assign a resource name to the event source bus for identifying the event source bus within the computing resource service provider 208 environment. The name of the third-party partner system 206 may be determined as part of a registration process for the third-party partner system 206. For instance, as part of this registration process, the computing resource service provider 208 may provide, to the third-party partner system 206, a unique identifier corresponding to the third-party partner system 206. This identifier may be a domain name of the third-party partner system 206.

In response to the request from the third-party partner system 206, the computing resource service provider may generate the event source bus. Additionally, the computing resource service provider 208 may provide, to the third-party partner system 206, the resource name of the event source bus to enable the third-party partner system 206 to query, using this resource name, the computing resource service provider 208 to perform various operations using the event source bus (e.g., delete the event source bus, re-assign the event source bus to an alternative customer account, etc.). The computing resource service provider 208 may use the account identifier provided by the third-party partner system 206 to identify the account of the computing resource service provider customer 202 to which the event source bus is to be associated. The computing resource service provider 208 may associate the event source bus to the account of the computing resource service provider customer 202 by incorporating the resource name and the event source name provided by the third-party partner system 206 into the account. Thus, if the computing resource computing service customer 202 submits a request to the computing resource service provider 208 to generate a new third-party event bus, the computing resource service provider 208 may identify, from the account, the event source bus as being available for association with the third-party event bus.

In an embodiment, the computing resource service provider 208 sets the state of the pairing of the event source bus and of the third-party event bus that is to be created to obtain the events from the event source bus to "pending, no bus." This may initiate a timer for the event source bus whereby a state machine that tracks the state of this pairing determines whether the event source bus has been idle for a pre-determined period of time since initiation of the timer. If the event source bus remains idle for this pre-determined period of time, the computing resource service provider 208 may automatically delete the event source bus. Further, the event source bus may remain in a "pending" state until a third-party event bus is generated that is associated with this event source bus.

Figure 3:
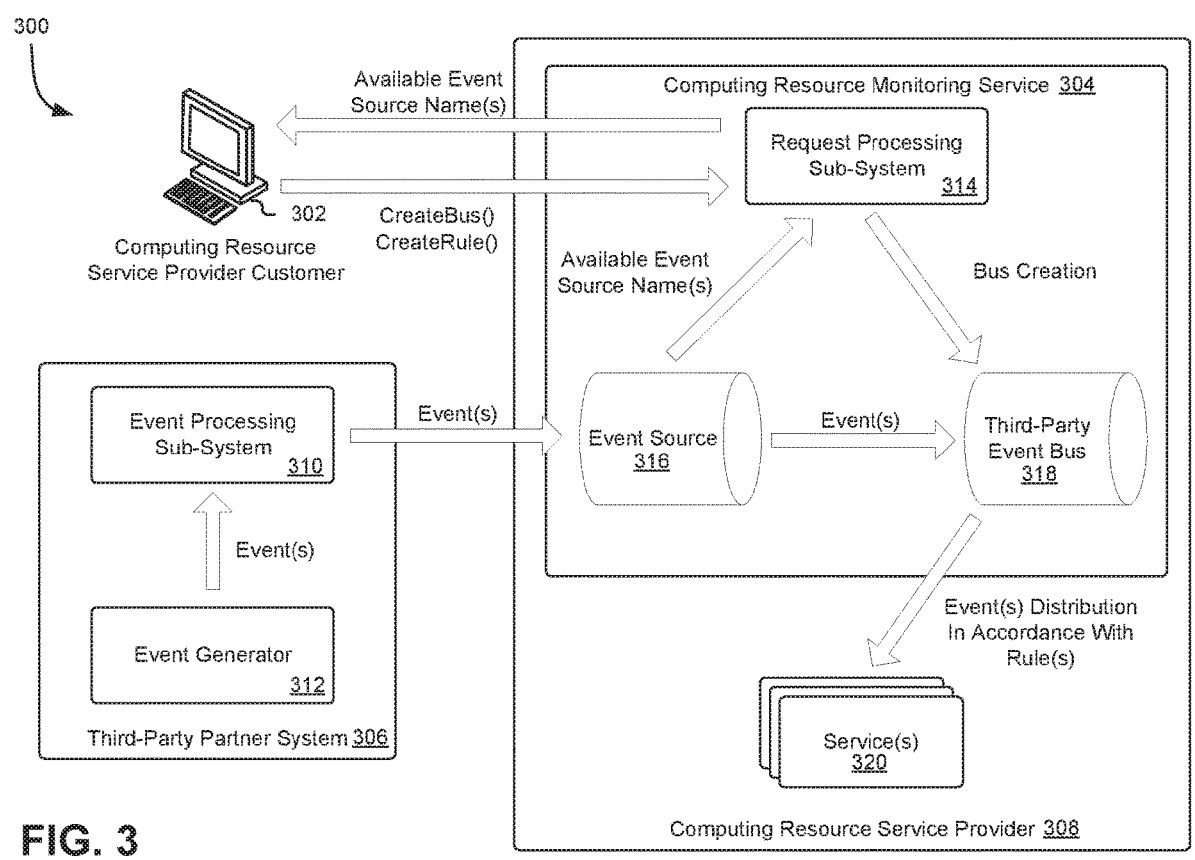
FIG. 3 shows an illustrative example of a system in which a computing resource monitoring service generates a third-party event bus for the compilation of events from an event source bus that can be processed by one or more other services in accordance with at least one embodiment.

FIG. 3 shows an illustrative example of a system 300 in which a computing resource monitoring service 304 generates a third-party event bus 318 for the compilation of events from an event source bus 316 that can be processed by one or more other services 320 in accordance with at least one embodiment. In the system 300, a request processing sub-system 314 of the computing resource monitoring service 304 obtains a request, from a computing resource service provider customer 302, to obtain a listing of available event source buses that may be associated with a third-party event bus 318. The request may specify an identifier of the computing resource service provider customer 302, which may be used by the request processing sub-system 314 to identify an account of the computing resource service provider customer 302. From this account, the request processing sub-system 314 may identify the resource names and/or the event source names of the available event source buses 316 that the customer 302 is authorized to associate with a third-party event bus 318. For instance, as described above, the request from an event processing sub-system 310 of the third-party partner system 306 may specify an identifier corresponding to the account of the computing resource service provider customer 302. Thus, upon creation of a new event source bus 316, the computing resource monitoring service 304 may associate this new event source bus 316 with the account of the computing resource service provider customer 302.

The computing resource monitoring service 304 may provide monitoring and observability of resources maintained by one or more services 320 of the computing resource monitoring service 304 by processing events generated by these resources. Further, the computing resource monitoring service 304 may collect data logs generated by these resources to obtain these events, as well as any other metrics that may be used to determine the performance of these resources and/or any changes to the state of these resources. The request processing sub-system 314 of the computing resource monitoring service 304 is implemented using hardware and software of the computing resource monitoring service 304 or abstraction thereof (such as one or more virtual machines operating via a hypervisor) and can comprise one or more processors and memory that stores executable instructions whose execution by the one or more processors causes the computer system to perform operations described herein. The events generated by the resources of the one or more services 320 and by the event generator 312 of the third-party partner system 306 may describe changes to the underlying resources (e.g., resources of the one or more services 320, the event generator 312, etc.) over time. These changes may include operational changes to these resources as they occur.

In response to the request from the computing resource service provider customer 302 to identify the event source buses 316 that may be associated with the account of the computing resource service provider 302, the request processing sub-system 314 may transmit, to the customer 302, a listing of the available event source buses 316 associated with the account. In an embodiment, the request processing sub-system 314 provides this listing via an interface (e.g., GUI) accessible by the computing resource service provider customer 302 upon communicating with the computing resource monitoring service 304. Alternatively, the listing may be provided in response to an API call from the customer 302 to identify the available event source buses 316 associated with the account.

From the listing, the computing resource service provider customer 302 may select a particular event source bus 316 that is to be associated with a third-party event bus 318 for distribution of events from the event generator 312 to one or more services 320 of the computing resource service provider 308. For instance, the computing resource service provider customer 302 may transmit an API call (e.g., "CreateBus( )" as illustrated in FIG. 3) to the request processing sub-system 314 to request generation of a new third-party event bus 318. Through this API call, the customer 302 may specify the identifier of the event source bus 316 (e.g., event source name) that is to be associated with the new third-party event bus 318. This may cause the request processing sub-system 314 to generate the third-party event bus 318 and associate the third-party event bus 318 with the event source bus 316 indicated in the request. In an embodiment, the request processing sub-system 314 assigns a resource name to the third-party event bus 318 that is based on the resource name and the event source name of the event source bus 316. This may allow the request processing sub-system 314 to identify the third-party event bus 318 using the resource name.

In an embodiment, the request processing sub-system 314 sets the state of the pairing of the event source bus and of the third-party event bus from "pending, no bus" to "pending, bus exists" to denote that the third-party event bus 318 has been generated and that it has been associated with the event source bus 316. Additionally, the request processing sub-system 314 may update the state machine to activate the event source bus 316 resulting in the state of the pairing transitioning from "pending, bus exists" to "active, bus exists." In this state, the event source bus 316 may transmit events to the third-party event bus 318. For instance, as the event generator 312 of the third-party partner system 306 generates events, the event processing sub-system 310 may transmit these events to the event source bus 316, where the events may remain until creation of the third-party event bus 318 and activation of the event source bus 316 through the state machine. In response to becoming activated, the event source bus 316 may transmit the events it has obtained from the third-party partner system 306 to the third-party event bus 318.

In an embodiment, the request processing sub-system 314 obtains an API call (e.g., "CreateRule( )" as illustrated in FIG. 3) from the customer 302 specifying a set of rules for distribution of the events from the third-party event bus 318 to one or more service services 320 of the computing resource service provider 308. For instance, through these rules, the customer 302 may define which events are to be transmitted to any of the one or more services 320 of the computing resource service provider 308. As an example, through a rule, the customer 302 may specify that events of a particular type are to be delivered from the third-party event bus 318 to a particular service 320 of the computing resource service provider 308 while other events of different types may be delivered to a different service. It should be noted that the customer 302 may not be required to provide any rules to the request processing sub-system 314, making the use of the API call optional. For instance, if the customer 302 does not provide any customer-defined rules for delivering events from the third-party event bus 318, the request processing sub-system 314 may rely on a set of default rules for routing the events from the third-party event bus 318 to the customer 302 or to some other entity for processing (e.g., a processing system of the computing resource monitoring service 304, an account of the customer 302, etc.).

Figure 4:
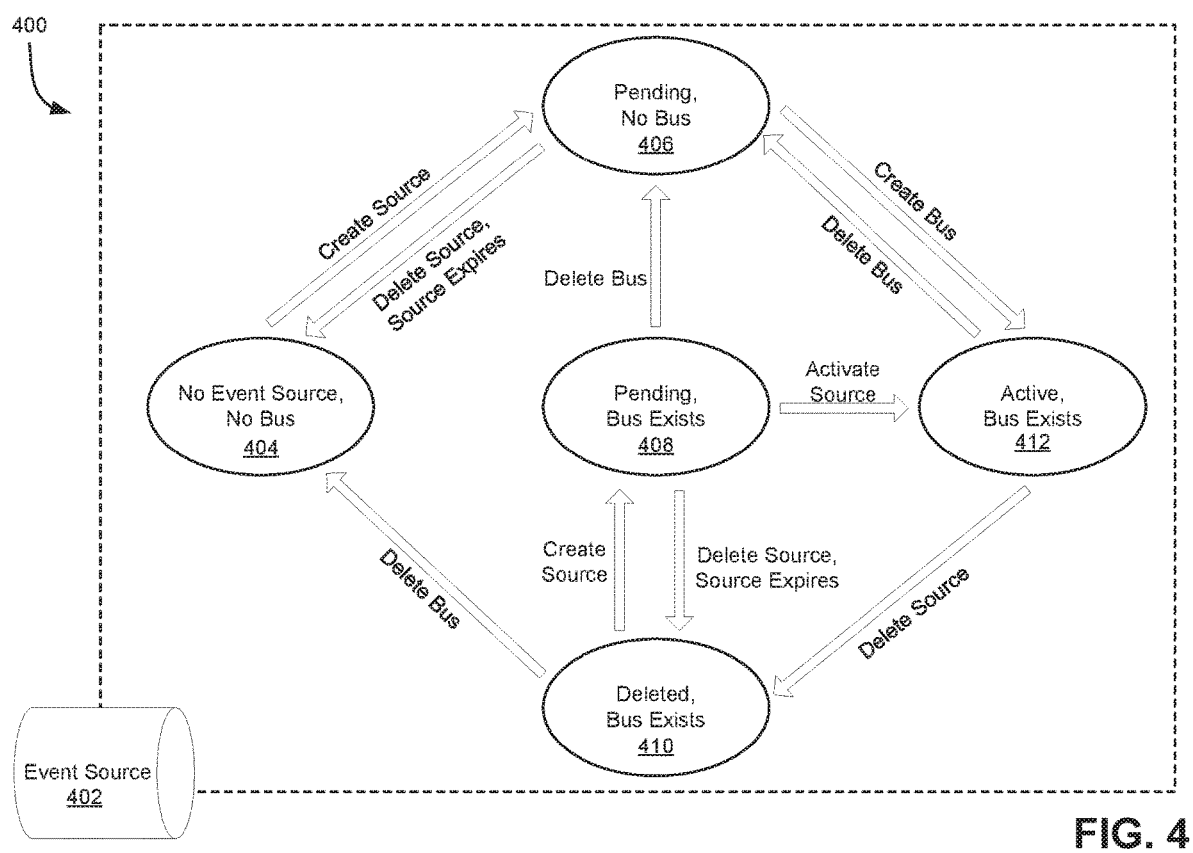
FIG. 4 shows an illustrative example of a system in which the state of an event source bus is transitioned based on requests from a customer and from a third-party partner system for managing the event source bus and a third-party event bus in accordance with at least one embodiment.

FIG. 4 shows an illustrative example of a system 400 in which the state of an event source bus 402 is transitioned based on requests from a customer and from a third-party partner system for managing the event source and a third-party event bus in accordance with at least one embodiment. In the system 400, a computing resource monitoring service maintains a state machine corresponding to the state of a pairing between an event source bus 402 and a corresponding third-party event bus to which the event source bus may transmit events generated by an event generator of a third-party partner system. Prior to creation of the event source bus 402 and of the corresponding third-party event bus, the computing resource monitoring service may maintain the state machine at a "no event source, no bus" state 404 to denote that neither the event source bus 402 or the corresponding third-party event bus have been created. Any events transmitted by the third-party partner system from the event generator may be rejected, as the event source bus 402 is non-existent.

At any time, the third-party partner system may transmit a request to the computing resource monitoring system to generate an event source bus 402 for making events from the event generator available to a third-party event bus for distribution to one or more services of a computing resource service provider. As noted above, this request may specify an identifier corresponding to an account of a computing resource service provider customer. Additionally, the request may specify an event source name of the event source bus 402. This event source name may be used by the third-party partner system to assign a resource name to the event source bus 402 and to associate the event source bus 402 with the account of the computing resource service provider customer. In response to the request and to creating the event source bus 402, the computing resource monitoring service may set the state machine to a "pending, no bus" state 406. In this state, the event source bus 402 may be visible to both the third-party partner system and the computing resource service provider customer. For example, if the customer submits a request to the computing resource monitoring service to identify any event source buses associated with the customer account, the computing resource monitoring service may provide the event source name of the event source bus 402. Additionally, in this state, the event source bus 402 may accept events provided by the third-party partner system from the event generator. However, these events are not provided to the customer, as the third-party event bus is yet to be present.

As noted above, the computing resource service provider customer may transmit a request to the computing resource monitoring service to generate a third-party event bus, which may be used to obtain events from the event source bus 402 and distribute these events to one or more services of the computing resource service provider. This request may specify the resource name or the event source name of the event source bus 402. If the state of the pairing of the event source bus 402 to the third-party event bus is set to a "pending, no bus" state 406, the computing resource monitoring service may set the state machine to a "pending, bus exists" state 408. From this state 408, the computing resource monitoring service may activate the event source bus 402 and set the state machine to an "active, bus exists" state 412. In this state 412, the third-party event bus may accept events from the event source bus 402 and delivers these events to the one or more services of the computing resource service provider in accordance with a set of customer-defined rules or, if the customer has not defined any rules for delivery of events from the third-party event bus, in accordance with a set of default delivery rules defined by the computing resource monitoring service.

If the third-party partner system submits a request to the computing resource monitoring service to delete the event source bus 402, the computing resource monitoring service may delete the event source bus 402 and update the state machine such that the state of the pairing is set to a "deleted, bus exists" state 410. In this state 410, the computing resource monitoring service may transmit a notification to the computing resource service provider customer to indicate that the third-party partner system has deleted the event source bus 402 and, thus, no new events are being transmitted by the third-party partner system for delivery to the third-party event bus. Further, in this state 410, the computing resource monitoring service may reject any events transmitted by the third-party partner system generated by the event generator. In an embodiment, if the state machine is set to the "deleted, bus exists" state 410, the third-party partner system can re-create the corresponding event source bus 402 without resurrecting any older third-party event buses along with any rules attached to these buses. If the third-party partner system re-creates the event source bus 402, the computing resource monitoring service may update the state machine to the "pending, bus exists" state 408. Further, the computing resource monitoring service may activate the event source bus 402 and change the state to the "active, bus exists" state 412 to allow events to be provided to the third-party event bus from the event source bus 402.

In an embodiment, if the state machine is set to the "pending, bus exists" state 408, the computing resource service provider customer can submit a request to the computing resource monitoring service to reattach the event source bus 402 to the third-party event bus without first deleting the third-party event bus. For instance, the customer may submit a request to the computing resource monitoring service to identify any existing event source buses that may be associated with the customer account. From a listing of existing event source buses, the customer may select the event source bus 402 for attachment to the existing third-party event bus. In response to this request, the computing resource monitoring service may associate the event source bus 402 to the existing third-party event bus and activate the event source bus 402 by transitions the state of the state machine from the "pending, bus exists" state 408 to the "active, bus exists" state 412. This may cause the event source bus 402 to initiate transmission of events from the event generator of the third-party partner system to the third-party event bus for transmission to one or more services of the computing resource service provider in accordance with any customer-defined rules or default rules established by the computing resource monitoring service.

In an embodiment, if the state machine is set to the "deleted, bus exists" state 410 and the customer submits a request to the computing resource monitoring service to delete the third-party event bus, the computing resource monitoring service deletes the third-party event bus and sets the state machine to the original "no event source, no bus" state 404. Alternatively, if the state machine is set to the "active, bus exists" state 412 and the customer submit a request to the computing resource monitoring service to delete the third-party event bus, the computing resource monitoring service may delete the third-party event bus and set the state machine to the "pending, no bus" state 406. In this state 406, the third-party partner system may continue to publish events from the event generator to the event source bus 402. Further, the computing resource monitoring service may monitor the event source bus 402 to determine whether the event source bus 402 has been in a pending state for a period longer than a pre-determined expiration time period. If the event source bus 402 has been in a pending state for a period longer than the pre-determined expiration time period, the computing resource monitoring service may determine that the event source bus 402 is expired. This may cause the computing resource monitoring service to delete the event source bus 402 and revert the state machine to the "no event source, no bus" state 404. Similarly, if the state machine is set to the "pending, bus exists" state 408 and the event source bus 402 remains in this state for a period longer than the pre-determined expiration time period, the computing resource monitoring service may delete the event source bus 402 and transition the state machine to the "deleted, bus exists" state 410. This may cause the computing resource monitoring service to notify the customer that the third-party partner system is no longer capable of transmitting events to the third-party event bus.

Figure 5:
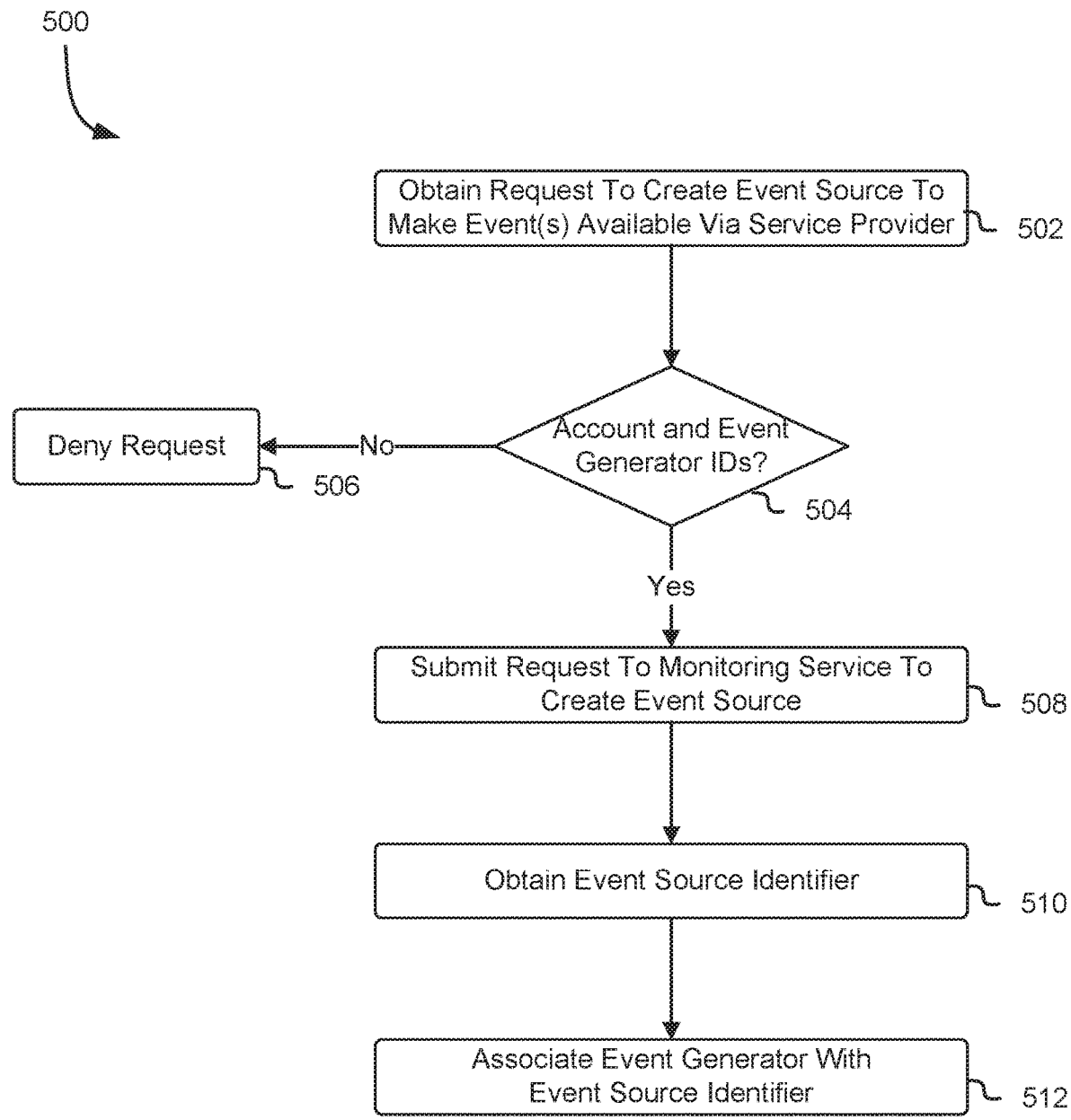
FIG. 5 shows an illustrative example of a process for creating an event source bus and associating an event generator with the event source bus in accordance with at least one embodiment.

FIG. 5 shows an illustrative example of a process 500 for transmitting a request to a computing resource monitoring service to create an event source bus and associating an event generator of a third-party partner system with the event source bus in accordance with at least one embodiment. The process 500 may be performed by a third-party partner system, which may maintain an event generator that generates events that may be published to an event source bus of a computing resource monitoring service to make these events available to a customer of a computing resource service provider. In an embodiment, the third-party partner system obtains 502 a request to create an event source bus at a computing resource monitoring service of a computing resource service provider to make these events available via the computing resource service provider. In response to the request, the third-party partner system may determine 504 whether the third-party partner customer has provided, with the request, an identifier corresponding to an account of a computing resource service provider customer and an identifier corresponding to an event generator from which events are to be obtained and published to the event source bus. For instance, the third-party partner system may provide, to the third-party partner customer, a listing of event generators accessible by the third-party partner customer from which events may be obtained. This listing may be provided via an interface, such as a GUI, or in response to an API call from the third-party partner customer to identify the event generators that may be available to the third-party partner customer. Additionally, a computing resource service provider customer may transmit a notification to the third-party partner customer to indicate that the computing resource service provider customer wants to obtain events generated by an event generator in order to make these events available to one or more other services provided by the computing resource service provider, other services provided by entities other than the computing resource service provider, the third-party partner system, and/or any other entities. In this notification, the computing resource service provider customer may provide an identifier corresponding to an account of the computing resource service provider customer maintained by the computing resource service provider. As noted above, the third-party partner customer and the computing resource service provider may be the same entity.

If the request from the third-party partner customer does not include either the identifier of the event generator from which events are to be published to the event source bus and/or the identifier corresponding to the account of the computing resource service provider customer, the third-partner system may deny 506 the request. Alternatively, if the request specifies both an identifier of the event generator and an identifier corresponding to the account of the computing resource service provider, the third-party partner system may assign an event source name that is to be associated with the requested event source bus. The event processing sub-system may associate this event source name with the event generator such that any events generated by the event generator may be published to the requested event source bus by the third-party partner system. Additionally, the third-party partner system may submit 508 a request to the computing resource monitoring service to create an event source bus. The request to the computing resource monitoring service may specify an identifier of the account of the computing resource service provider, as well as a unique event source name created by the third-party partner system that is to be assigned to the event source bus. In response to the request from the third-party partner system, the computing resource monitoring service may generate the event source bus and assign, to the event source bus, a unique event source identifier. This unique event source identifier may be used by the computing resource monitoring service to utilize the event source bus for maintaining the state of any pairing between the event source bus and a corresponding third-party event bus created by the computing resource monitoring service on behalf of the computing resource service provider customer. The third-party partner system may obtain 510 the event source identifier from the computing resource monitoring service and associate 512 this identifier with the event generator. Thus, as the event generator creates new events, the third-party partner system may use the event source identifier to access the newly created event source bus and publish the events from the event generator to the event source bus.

Figure 6:
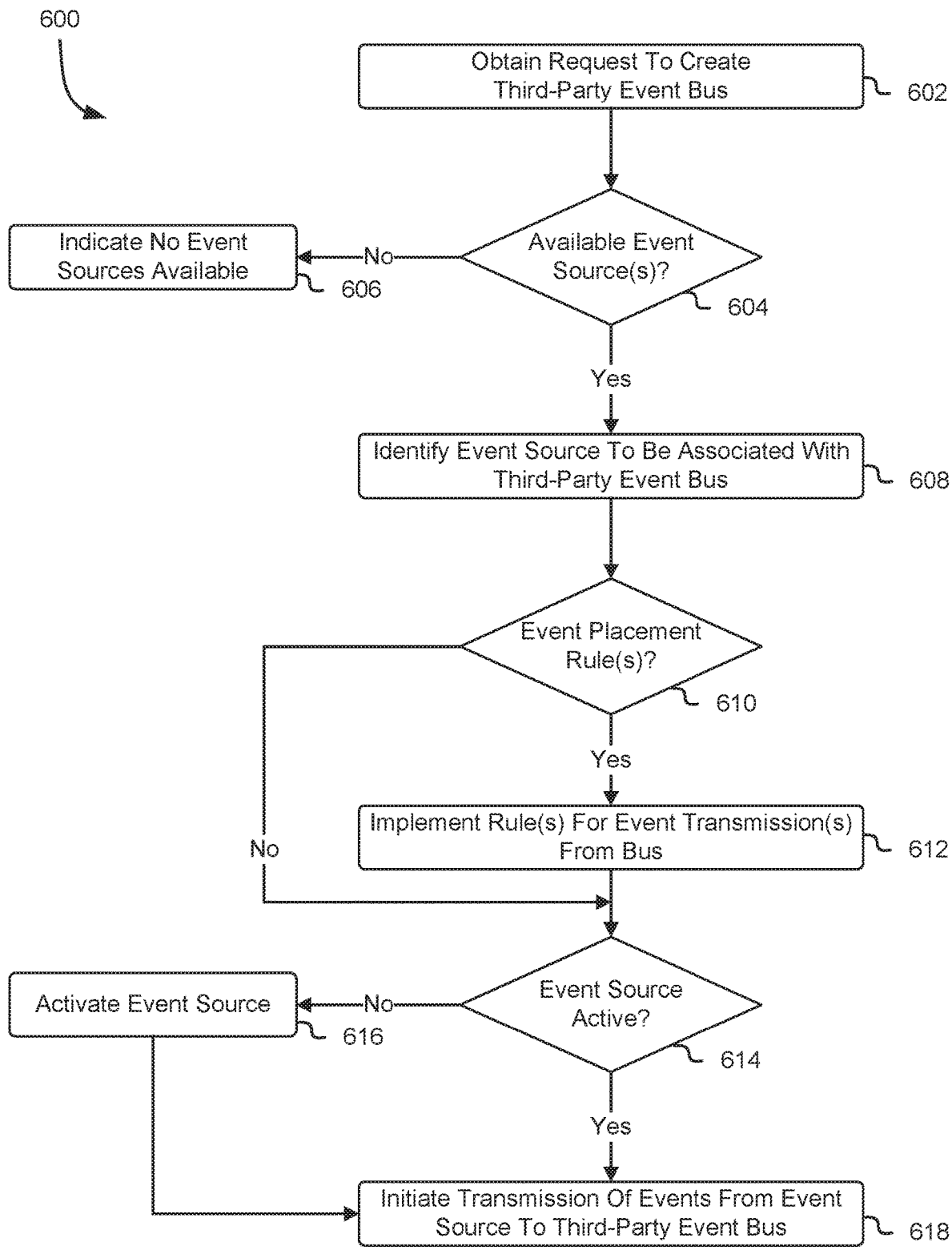
FIG. 6 shows an illustrative example of a process for creating a third-party event bus and associating the third-party event bus to an event source bus to cause the third-party event bus to obtain events from the event source bus and make these events available to other services in accordance with at least one embodiment.

FIG. 6 shows an illustrative example of a process 600 for creating a third-party event bus and associating the third-party event bus to an event source bus to cause the third-party event bus to obtain events from the event source bus and make these events available to other services in accordance with at least one embodiment. The process 600 may be performed by a computing resource monitoring service, which may process incoming requests from computing resource service provider customer to generate a third-party event bus and to associate the third-party event bus to a particular event source bus for obtaining events from an event generator of a third-party partner system. In an embodiment, the computing resource monitoring service obtains 602 a request from a computing resource service provider customer to create a third-party event bus. For instance, the computing resource service provider customer may transmit an API call (e.g., "CreateBus( )") to the computing resource monitoring service to request generation of a new third-party event bus. As parameters of the API call, the customer may specify the identifier of the event source bus (e.g., event source name) that is to be associated with the new third-party event bus. In an embodiment, the computing resource monitoring service provides, via an interface, a listing of event source buses that may be available to the customer. As noted above, a third-party partner system provides an identifier of an account of the computing resource service provider customer in its request to create an event source bus. Thus, the computing resource monitoring service may associate this event source bus with the customer account. Through this listing, the customer may select an event source bus and obtain the identifier of the event source bus that is to be associated with the third-party event bus.

In response to the request, the computing resource monitoring service may determine 604 whether there are any available event source buses for association with the third-party event bus. For instance, the computing resource monitoring service may evaluate the customer account to determine whether the account is associated with any event source buses. If there are no event source buses available that can be associated with the third-party event bus, the computing resource monitoring service may indicate 606 that no event source buses are available. For instance, through an interface (e.g., GUI), the computing resource monitoring service may display a null list of available event source buses. Additionally, the computing resource monitoring service may deny the request from the customer.

If the computing resource monitoring service determines that there are available event source buses that can be associated with the third-party event bus, the computing resource monitoring service may evaluate the request to identify 608 the event source bus that is to be associated with the third-party event bus. As noted above, the request may include an identifier corresponding to the event source bus that is to be associated with the third-party event bus. Thus, using this identifier, the computing resource monitoring service may identify the event source bus. In addition to identifying the event source bus to be associated with the third-party event bus, the computing resource monitoring service may determine 610 whether the customer has provided any event placement rules. The event placement rules may specify where the events of the third-party event bus are to be transmitted. For instance, the event placement rules may indicate that events obtained from a particular event source bus are to be published to a particular service provided by the computing resource service provider or to other accounts maintained by the computing resource service provider. If the customer submits a request (e.g., a "CreateRule( )" API call) to implement one or more event placement rules, the computing resource monitoring service may implement 612 the one or more event placement rules for the transmission of events from the third-party event bus to the one or more services of the computing resource service provider. As noted above, the computing resource service provider customer may not be required to provide the one or more rules to the computing resource service provider, in which case the computing resource service provider may implement one or more default rules for placement of events from the third-party event bus. For instance, a default rule may cause the computing resource service provider 108 to publish events from the third-party event bus to a repository of the computing resource service provider customer.

The computing resource monitoring service may further determine 614 whether the event source bus that is to be associated with the third-party event bus is active. As noted above, the pairing of the event source bus to the third-party event bus may be in a "pending, no bus" state upon provisioning of the event source bus. In response to creation of the third-party event bus and association of the event source bus to the third-party event bus, the computing resource monitoring service may determine that the event source bus is to be activated. Thus, if the pairing is in a "pending, no bus" or "pending, bus exists" state, the computing resource monitoring service may activate 616 the event source bus to change the state of the pairing to an "active, bus exists" state. In this state, the computing resource monitoring service may initiate 618 transmission of events from the event source bus to the third-party event bus. Further, the computing resource monitoring service may transmit events from the third-party event bus to other services and/or to the customer in accordance with either the event placement rules provided by the customer or the default event placement rules imposed by the computing resource monitoring service if the customer has not provided its own event placement rules.

It should be noted that the process 600 may be performed using additional, fewer, or alternative operations than those illustrated in FIG. 6. In an embodiment, the computing resource monitoring service determines 614 whether the event source is active in response to identifying the event source that is to be associated with the third-party event bus without determining whether any event placement rules have been obtained. For instance, a customer of the computing resource service provider may submit, at a later time, a request to implement a set of rules for distribution of events from the third-party event bus to other entities. Thus, the processing of this request to implement a set of rules may be performed independently of the other operations of the process 600.

Figure 7:
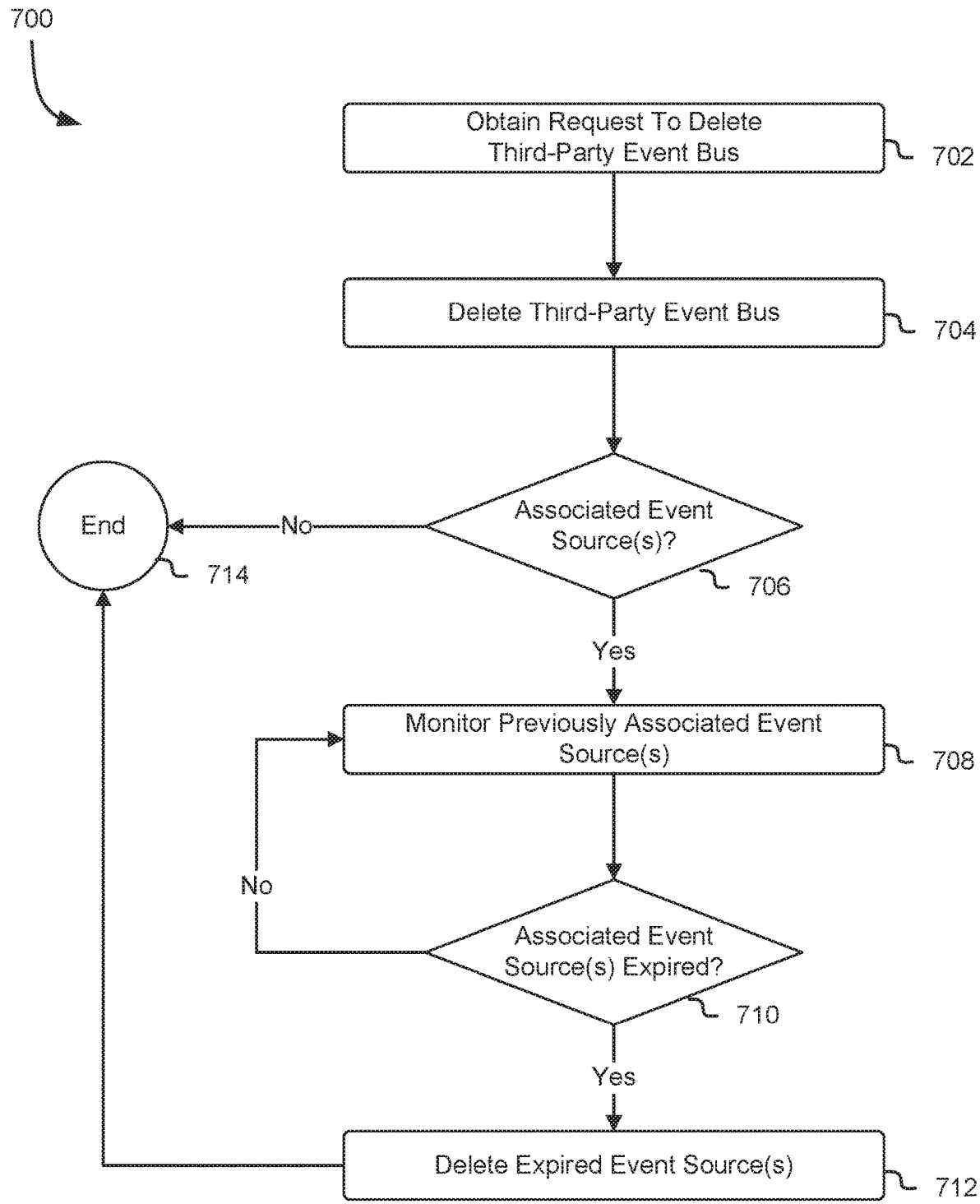
FIG. 7 shows an illustrative example of a process for deleting a third-party event bus in accordance with at least one embodiment.

FIG. 7 shows an illustrative example of a process 700 for deleting a third-party event bus in accordance with at least one embodiment. The process 700 may be performed by the computing resource monitoring service, which may maintain the third-party event bus on behalf of a customer and transmit events from the third-party event bus to other services and/or customers based on rules defined by a computing resource service provider customer and/or the computing resource monitoring service itself. In an embodiment, the computing resource monitoring service obtains 702 a request to delete a third-party event bus. The request may specify an identifier of the third-party event bus, which the computing resource monitoring service may use to identify the third-party event bus that is to be deleted.

In response to the request from the computing resource service provider customer, the computing resource monitoring service may delete 704 the third-party event bus and determine 706 whether the third-party event bus was associated with an event source bus from which the third-party event bus may have obtained events for distribution to other services and/or customers in accordance with a set of event placement rules. If the computing resource monitoring service determines that the deleted third-party event bus was not associated with any event source bus, the computing resource monitoring service may set the state of the pairing of the event source bus to the third-party event bus to a "no event source, no bus" state and terminate 714 execution of the process 700.

If the deleted third-party event bus was associated with an existing event source bus, the computing resource monitoring service may set the state of the pairing of the event source bus to the third-party event bus to a "pending, no bus" state. The computing resource monitoring service may monitor 708 the event source bus to determine 710 whether the event source bus has expired. For instance, the computing resource monitoring service may monitor the event source bus to determine whether the event source bus has been in a pending state for a period longer than a pre-determined expiration time period. If the event source bus has been in a pending state for a period longer than the pre-determined expiration time period, the computing resource monitoring service may determine that the event source bus is expired. This may cause the computing resource monitoring service to delete 712 the event source bus and revert the state machine to the "no event source, no bus" state. The computing resource monitoring service may terminate 714 the process 700 once the expired event source bus has been deleted. However, if the event source bus has not expired, the computing resource monitoring service may continue to monitor the event source bus. Thus, if the customer submits a request to provision a new third-party event bus, the event source bus may be available for association with the new third-party event bus and to publish events to the third-party event bus.

Figure 8:
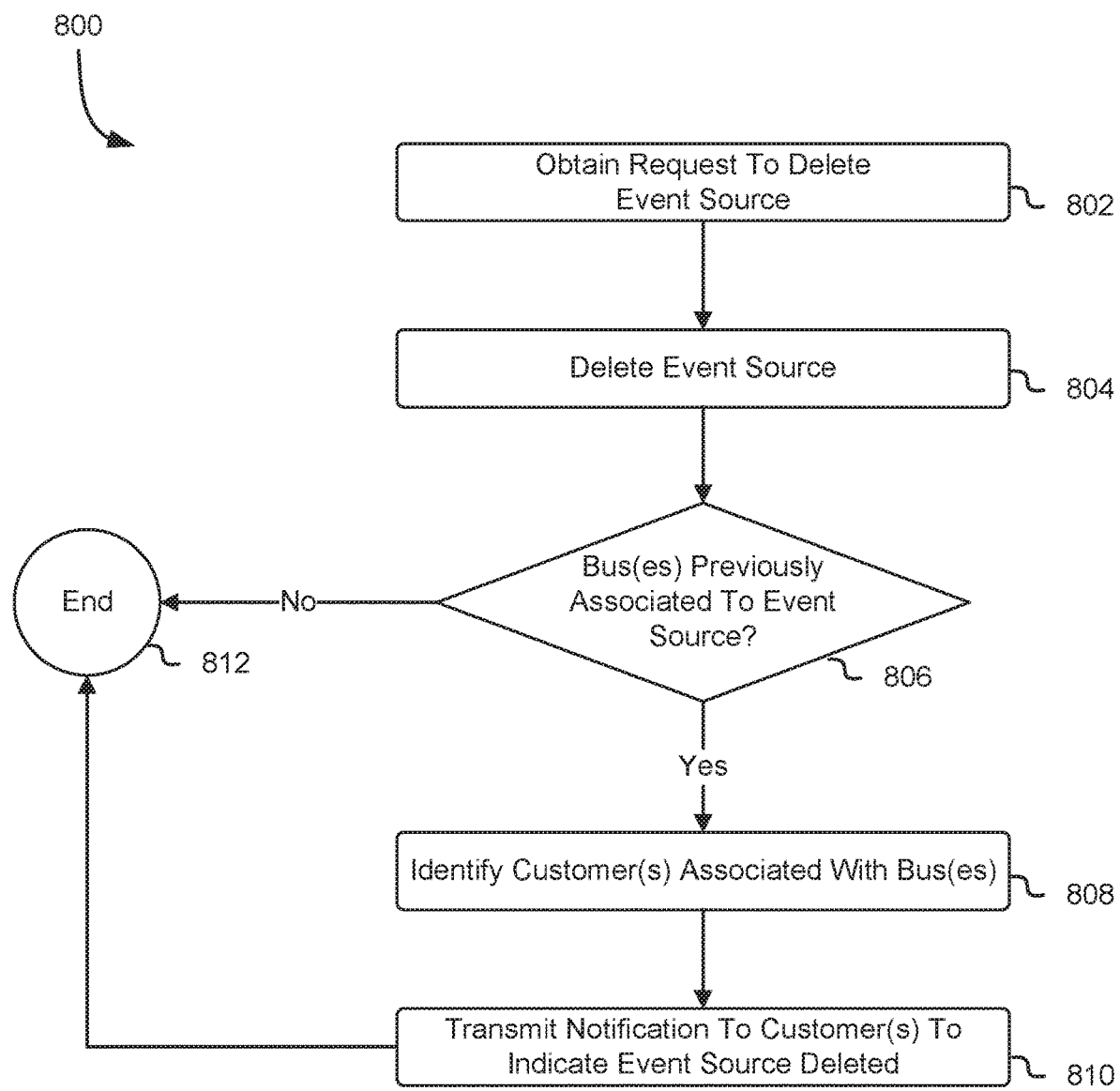
FIG. 8 shows an illustrative example of a process for deleting an event source bus in accordance with at least one embodiment.

FIG. 8 shows an illustrative example of a process 800 for deleting an event source bus in accordance with at least one embodiment. The process 800 may be performed by the computing resource monitoring service, which may process incoming requests from third-party partner systems to maintain event source buses for publishing events from event generators of these third-party partner systems to services and customers of a computing resource service provider. In an embodiment, the computing resource monitoring service obtains 802 a request to delete an event source bus. The request may be provided by a third-party partner system that originally requested creation of the event source bus to publish events from an event generator to a third-party event bus of a customer of the computing resource service provider for distribution to customers and services of the computing resource service provider. The request from the third-party partner system may include an identifier (e.g., event source name) of the event source bus that is to be deleted.

In response to the request, the computing resource monitoring service may delete 804 the event source bus and determine 806 whether the event source bus was associated with an existing third-party event bus. For instance, using the identifier provided in the request, the computing resource monitoring service may query the customer account to identify if a third-party event bus exists corresponding to the identifier. In an embodiment, if the deleted event source bus was not associated with an existing third-party event bus, the computing resource monitoring service sets the state of the pairing of the event source bus to the third-party event bus to a "no event source, no bus" state and terminates 812 the process 800.

If the deleted event source bus was associated with an existing third-party event bus, the computing resource monitoring service may set the state of the pairing to a "deleted, bus exists" state and identify 808 the customer associated with the third-party event bus. For instance, the computing resource monitoring service may use the identifier of the third-party event bus to identify a customer account associated with the third-party event bus. The computing resource monitoring service may transmit 810 a notification to the computing resource service provider customer to indicate that the third-party partner system has deleted the event source bus and, thus, no new events are being transmitted by the third-party partner system for delivery to the third-party event bus. Further, in this state, the computing resource monitoring service may reject any events transmitted by the third-party partner system generated by the event generator. Transmission of the notification may cause the computing resource monitoring service to terminate 812 the process 800.

Figure 9:
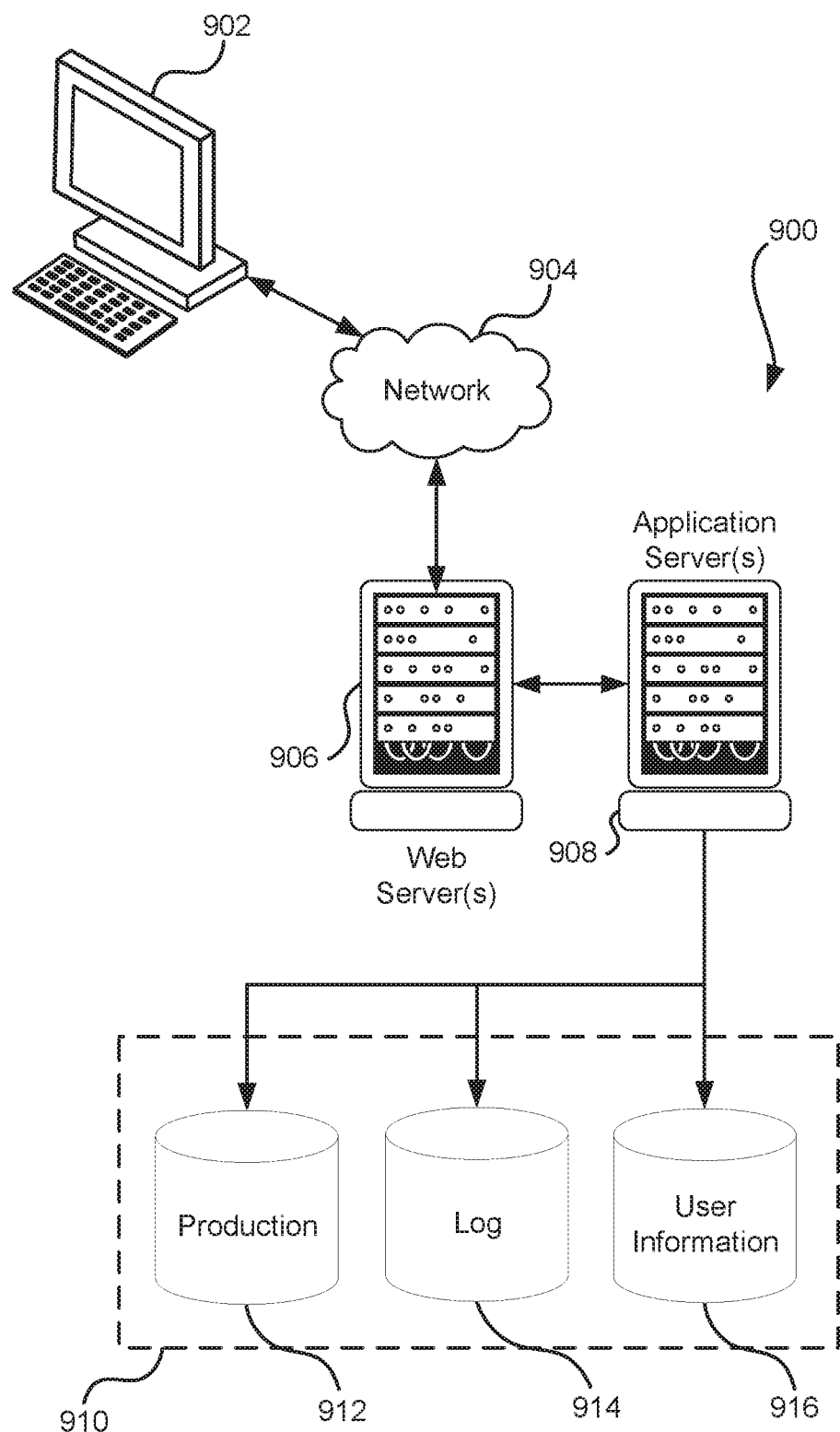
FIG. 9 shows an illustrative example of a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a computing resource service provider and from a third-party partner system on behalf of a third-party partner system customer, a first request to generate an event source bus, the first request specifying a first identifier corresponding to an account of a customer of the computing resource service provider;
   updating a record of the account of the customer of the computing resource service provider to indicate presence of the event source bus;
   obtaining, from a client device of the customer of the computing resource service provider, a second request to generate a third-party event bus and to associate the third-party event bus with the event source bus, the second request including a second identifier corresponding to the event source bus;
   in response to the second request, activating the event source bus to establish an association between the event source bus and the third-party event bus;
   obtaining, from the third-party partner system, and providing to the event source bus, a set of events generated by a resource of the third-party partner system; and
   publishing the set of events to cause the third-party event bus to distribute the set of events.

2. The computer-implemented method of claim 1, further comprising:
   obtaining, from the third-party partner system, a third request to delete the event source bus;
   in response to the third request, deleting the event source bus; and
   providing, to the client device of the customer of the computing resource service provider and as a result of deleting the event source bus, a notification to indicate that the event source bus is deleted.

3. The computer-implemented method of claim 1, further comprising:
   obtaining, from the client device of the customer of the computing resource service provider, a third request to delete the third-party event bus;
   in response to the third request, deleting the third-party event bus;
   as a result of deleting the third-party event bus, monitoring the event source bus to determine that the event source bus is expired; and
   in response to determining that the event source bus is expired, deleting the event source bus.

4. The computer-implemented method of claim 1, further comprising implementing a set of rules specifying instructions that, as a result of being executed by the third-party event bus, cause the third-party event bus to distribute the set of events.

5. A system, comprising:
   one or more processors; and
   memory that stores computer-executable instructions that are executable by the one or more processors to cause the system to:
      obtain, from a third-party partner system, a first request to generate a first bus;
      update an account maintained by a service provider to indicate presence of the first bus;
      obtain, from a client device of a customer of the service provider, a second request to associate a second bus with the first bus;
      activate the first bus to establish an association with the second bus;
      obtain, and provide to the first bus, a set of events generated by a resource of the third-party partner system; and
      publish the set of events to cause the second bus to distribute the set of events to another entity.

6. The system of claim 5, wherein:
the second request to associate the second bus with the first bus is a request to generate the second bus, the second request including an identifier of the first bus usable to establish the association; and
the computer-executable instructions further cause the system to provision, in response to the second request, the second bus.

7. The system of claim 5, wherein:
the first request to generate the first bus includes an identifier corresponding to the account maintained by the service provider; and
the computer-executable instructions further cause the system to use the identifier corresponding to the account to update the account to indicate the presence of the first bus.

8. The system of claim 5, wherein the computer-executable instructions further cause the system to obtain a set of rules specifying instructions that, as a result of being executed by the second bus, cause the second bus to distribute the set of events to the other entity.

9. The system of claim 5, wherein the computer-executable instructions further cause the system to:
obtain a third request to delete the first bus; and
in response to the third request:
delete the first bus; and
provide a notification to indicate that the first bus has been deleted.

10. The system of claim 5, wherein the computer-executable instructions further cause the system to:
obtain a third request to delete the second bus; and
in response to the third request:
delete the second bus; and
monitor the first bus to identify an indication that the first bus is expired.

11. The system of claim 10, wherein the computer-executable instructions further cause the system to:
obtain the indication that the first bus is expired; and
in response to the indication, delete the first bus.

12. The system of claim 10, wherein the computer-executable instructions further cause the system to:
obtain a fourth request to generate another second bus, the fourth request specifying an identifier of the first bus;
generate the other second bus;
determine whether first bus is in a pending state; and
re-activate the first bus to establish an association with the other second bus.

13. A non-transitory computer-readable storage medium storing thereon executable instructions that, as a result of being executed by one or more processors of a computer system, cause the computer system to at least:
obtain a first request to generate a first bus;
update an account maintained by a first service to indicate presence of the first bus;
obtain, from a client device of a customer of the first service, a second request to associate a second bus with the first bus; and
activate the first bus to establish an association with the second bus to cause events generated by a resource of another system associated with a second service and provided to the first bus to be published via the second bus.

14. The non-transitory computer-readable storage medium of claim 13, wherein the first request to generate the first bus specifies an identifier corresponding to the account maintained by the first service.

15. The non-transitory computer-readable storage medium of claim 13, wherein execution of the executable instructions further causes the computer system to:
determine whether the first bus is expired;
in response to determining that the first bus is expired, delete the first bus; and
transmit a notification to indicate that the first bus is expired.

16. The non-transitory computer-readable storage medium of claim 15, wherein execution of the executable instructions further causes the computer system to:
obtain a third request to publish second events generated by the resource of the other system;
determine whether the first bus is deleted; and
as a result of the first bus being deleted, reject the third request.

17. The non-transitory computer-readable storage medium of claim 13, wherein execution of the executable instructions further causes the computer system to:
obtain a third request to implement a set of rules usable by the second bus to determine distribution of the events to at least one other entity; and
implement the set of rules to cause the second bus to distribute the events to the at least one other entity in accordance with the set of rules.

18. The non-transitory computer-readable storage medium of claim 13, wherein:
the second request to associate the second bus with the first bus is a request to generate the second bus, the second request including an identifier of the first bus; and
execution of the executable instructions further causes the computer system to:
provision, in response to the second request, the second bus; and
use the identifier of the first bus to initiate activation of the first bus.

19. The non-transitory computer-readable storage medium of claim 13, wherein execution of the executable instructions further causes the computer system to:
obtain a third request to delete the second bus;
in response to the third request, delete the second bus; and
monitor the first bus to determine whether the first bus is expired.

20. The non-transitory computer-readable storage medium of claim 19, wherein execution of the executable instructions further causes the computer system to:
obtain, and provide to the first bus, second events generated by the resource of the other system; and
maintain the second events at the first bus.

* * * * *